(12) United States Patent
Yoshikawa

(10) Patent No.: US 6,256,114 B1
(45) Date of Patent: Jul. 3, 2001

(54) COMMUNICATION TERMINAL APPARATUS

(75) Inventor: Hiroyasu Yoshikawa, Kyotanabe (JP)

(73) Assignee: Murata Kikai Kabushiki Kaisha, Kyoto (JP)

( * ) Notice: Subject to any disclaimer, the term of this patent is extended or adjusted under 35 U.S.C. 154(b) by 0 days.

(21) Appl. No.: 08/951,422

(22) Filed: Oct. 16, 1997

(30) Foreign Application Priority Data

Oct. 18, 1996 (JP) .................................................. 8-276677

(51) Int. Cl.[7] .............................. H04N 1/00; H04N 1/32
(52) U.S. Cl. ........................ 358/407; 358/442; 358/468
(58) Field of Search ............................... 358/407, 400, 358/434, 435, 442, 468; 379/100.9

(56) References Cited

U.S. PATENT DOCUMENTS

| 5,134,501 | * | 7/1992 | Satomi et al. | 358/400 |
| 5,428,458 | | 6/1995 | Aiba et al. | 358/434 |
| 5,499,109 | | 3/1996 | Mathur et al. | 358/400 |
| 5,517,324 | * | 5/1996 | Fite, Jr. et al. | 358/434 |
| 5,528,383 | * | 6/1996 | Tezuka et al. | 358/435 |

FOREIGN PATENT DOCUMENTS

| 31 35 963 A1 | 4/1982 | (DE) . |
| 7-221955 | 8/1995 | (JP) . |
| 94/06230 | 3/1994 | (WO) . |

* cited by examiner

Primary Examiner—Cheukfan Lee
(74) Attorney, Agent, or Firm—Armstrong, Westerman, Hattori, McLeland & Naughton, LLP

(57) ABSTRACT

A communication terminal device of the present invention, having a function for transfer of file data such as code data and binary data, can relay or broadcast file data received from another communication terminal device to yet another communication terminal device. When the communication terminal device as the relay destination is not able to receive file data, the communication terminal device of the present invention converts the received file data to facsimile coded data and transmit it. For that purpose, the communication terminal device is provided with a character generator that converts code data to image data.

4 Claims, 4 Drawing Sheets

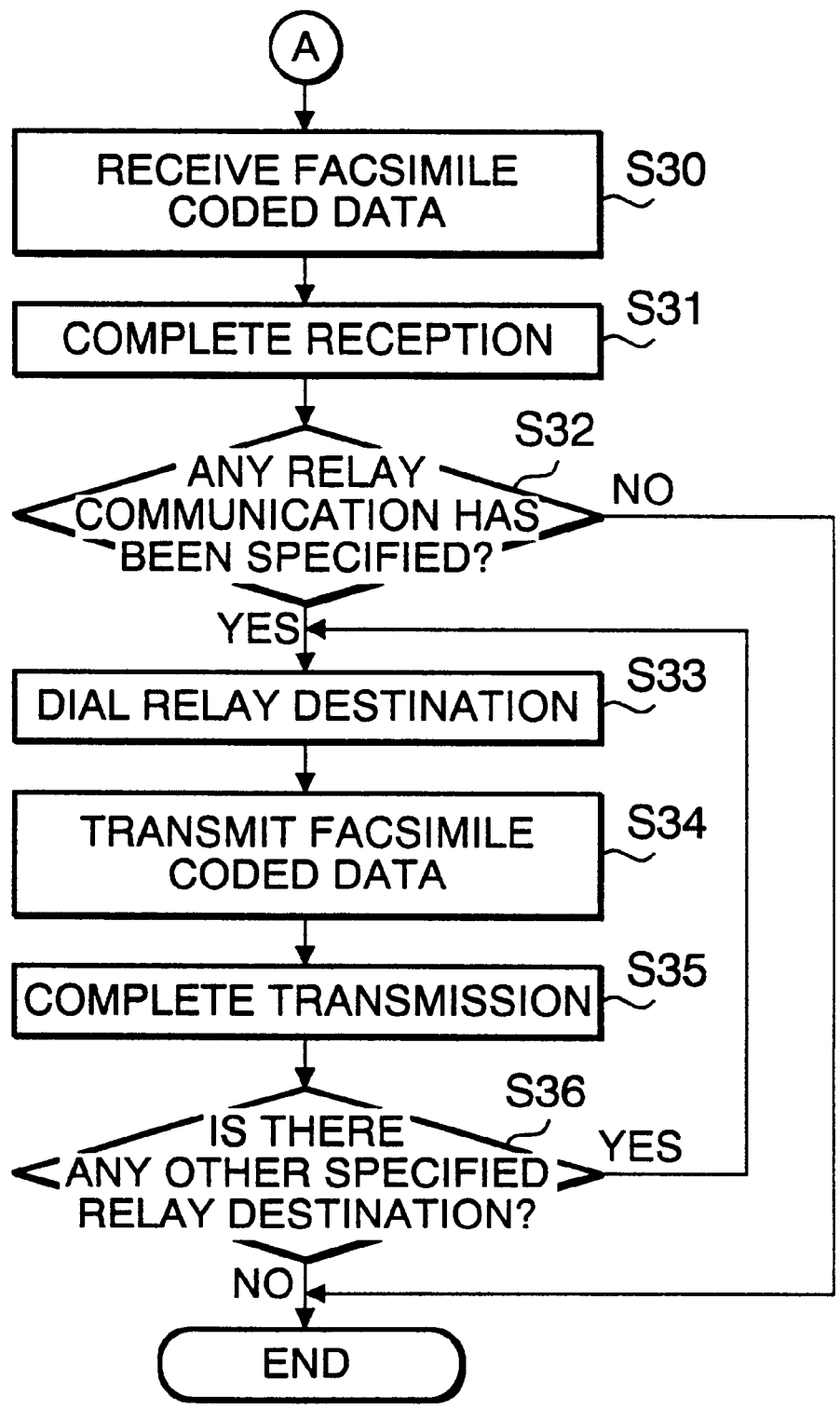

COMMUNICATION TERMINAL APPARATUS

BACKGROUND OF THE INVENTION

1. Technical Field

The present invention relates to a communication terminal apparatus and more specifically, to a communication terminal apparatus such as a facsimile device that is capable of transfer of file data including character code or binary data of a file format or the like used by a system such as a computer system, which file data differing from facsimile coded data used in normal facsimile communication such as MH or MR coding or the like.

2. Background Art

Functions called relay communication and broadcasting communication exist in facsimile communication. Relay communication is a function that relays information sent to a second facsimile device from a first facsimile device, to a third facsimile device specified beforehand by the first facsimile device, by transferring the information from the second facsimile device to the third facsimile device. Furthermore, broadcasting communication is a function that transmits the same information from one facsimile device to a plurality of other pre-specified other facsimile devices.

Conversely, the file transfer (BFT:Binary File Transfer) protocol has been determined. Using this protocol, it is possible to transmit and receive file data (such as binary data, character data) and facsimile coded data in the same call. The encoding regulations for binary file data have been set by ITU-T (International Telecommunications Union-Communication Standards Section) recommendation T.434.

However, as the aforementioned file data transfer functions (hereafter, called file transfer functions) are optional, there are facsimile devices on which these functions are possible and those on which these are not. That is, there are facsimiles that can only transmit and receive facsimile coded data. Accordingly, when relay communication or broadcasting communication is to be performed by facsimile communication, file transfer can be carried out when it is aimed at only facsimile devices having file transfer functions. But when both types (those capable of file transfer and those not) are present together, only the transmission of facsimile coded data can be carried out.

But together with the widespread use of personal computers, the first device to start the facsimile communication is often a personal computer and not a proper facsimile device that transmits facsimile coded data. In this case, the probability is high that the transmitted document is produced by a personal computer as a file of character code or binary image data (bitmap format, TIFF format etc.). However, even when the receiving side facsimile device is capable of file transfer functions, it becomes necessary to convert file data and exchange facsimile coded data for reliable relaying despite the direct transmission as file data of character code or binary image data being more efficient.

Furthermore, problems relating to the abilities of the various facsimile devices also arise when file data of the character code or binary image data file is to be transmitted after conversion to facsimile coded data. For example, problems with the font when character code is to be converted to facsimile coded data after being bitmapped in the memory, and problems with the resolution during conversion to facsimile coded data. Due to this, it may be desirable to perform a file transfer to a certain device by character code or binary image data and then convert that file to facsimile coded data at the font and resolution of that particular device.

Some of the matter contained herein is disclosed and claimed in the Japanese Patent Application No. 7-264376. A difference between the present invention and the application above can be summarized as follows. The above patent (JPA 7-264376) describes how code data received from a host computer is transmitted after conversion to image data when a third party as the transmission destination is a G3 facsimile device and transmitted unchanged as code data when the third party is a G4 facsimile device. However, nothing is stated about when binary data is received from a host computer nor is there anything about relay and broadcasting in the application.

SUMMARY OF THE INVENTION

In view of the above problems, it is an object of the present invention to propose a communication terminal device such as a facsimile device which, when the facsimile device is specified to relay file data which has been file transferred from another device to yet another facsimile device, is capable of relay transmission and broadcasting transmission even if devices which are and which are not capable of file transfer are both present, by directly relaying when the destination facsimile device is capable of file transfer or by relaying after conversion of the file data to normal facsimile coded data when the destination facsimile device is not capable of file transfer.

The communication terminal device of the present invention has a function that relays received information to a specified device and a transfer function of file data (BFT: binary file transfer function), transmits (relays) the received file data unchanged to a device having the file data transfer functions, and transmits (relays) the received file data after conversion to facsimile coded data to a device not having those functions.

That is, on the communication terminal device of the present invention, when file data is relayed and if the relay destination communication terminal device has file data transfer functions, the received filed data is relayed by direct transmission. On the other hand, if the relay destination communication terminal device does not have file data transfer functions, the received file data is relayed after conversion to facsimile coded data. Thus, it is no longer necessary to check beforehand whether the relay destination communication terminal device has file transfer functions.

Furthermore, the communication terminal device of the present invention is provided with a character generator that converts the character code into a character pattern (the file data to be transferred by the communication terminal device may include character code).

Accordingly, as the communication terminal device of the present invention is provided with a character generator, when the transferred file data includes character code, a hard copy or soft copy may be directly produced.

Yet further, in the communication terminal device of the present invention, the file data to be transferred may include binary image data.

Accordingly, on the communication terminal device of the present invention, when the transferred file data includes binary image data, a hard copy output is possible by the conversion of the file data to facsimile coded data.

BRIEF DESCRIPTION OF THE ACCOMPANYING DRAWINGS

FIG. 4 is a flow chart for describing the actions of the facsimile device of the present invention.

DETAILED DESCRIPTION OF THE PREFERRED EMBODIMENTS

Figure 1:
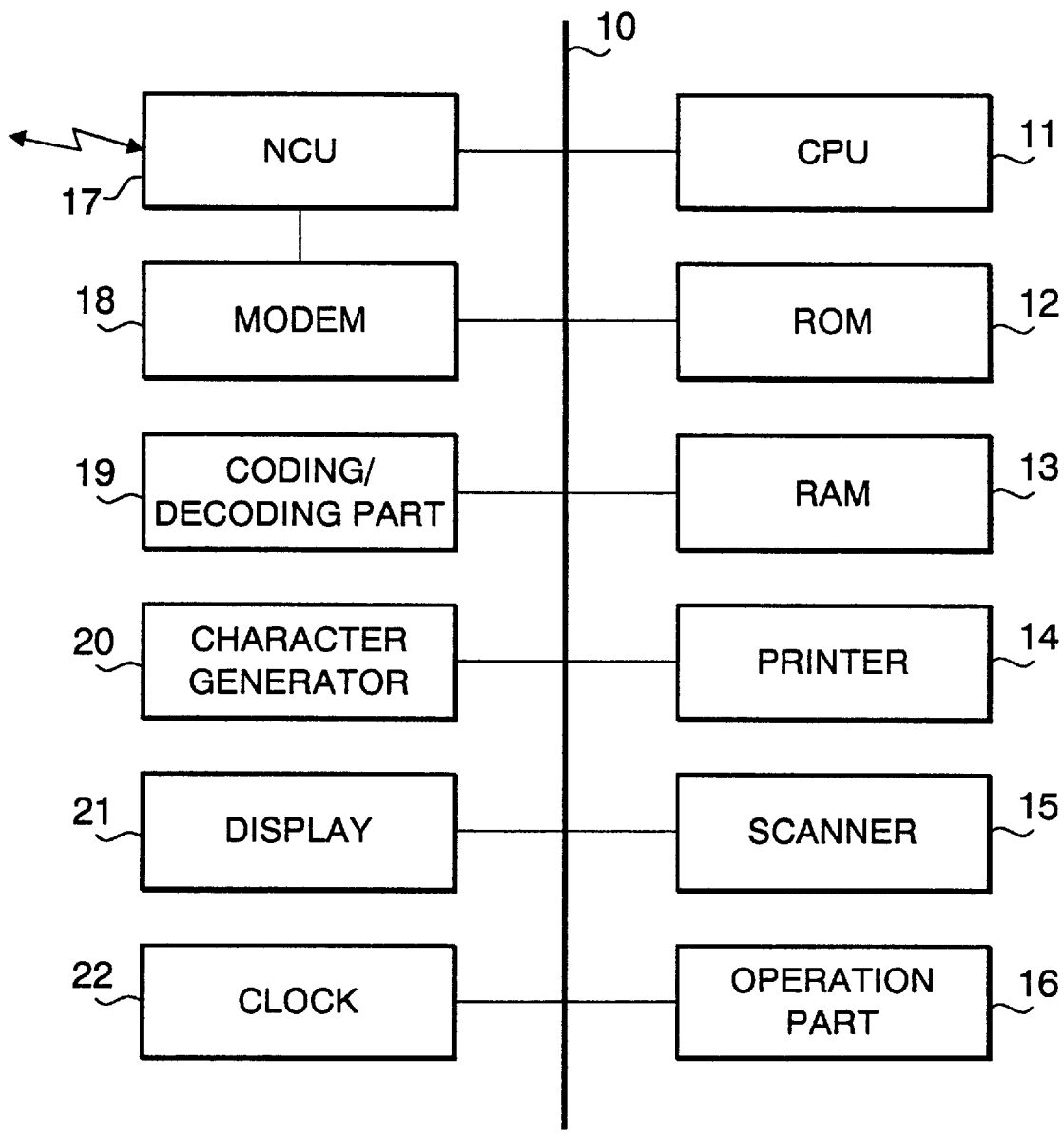
FIG. 1 is block diagram showing an embodiment of a facsimile device of the present invention.

Hereafter, an embodiment of the present invention will be described based on the accompanying drawings. FIG. 1 is a block diagram showing an example of arrangement of a facsimile device as one example of a communication terminal device according to the embodiment of the present invention.

Numeral 11 is a CPU that functions as a control means and is connected via a bus 10 to a ROM 12 that stores the programs or the like of the operation procedures of the facsimile device, a RAM 13 that functions as a memory means for temporarily storing facsimile coded data, file data and other types of data, a printer 14 that functions as a printing output that prints the image signal on paper, a scanner 15 that outputs image data converted to binary by using a CCD (Charged Couple Device) or the like for scanning the document, an operation part 16 such as a key matrix or the like, a part that controls the communication functions such as an network control unit (NCU) 17 or modem 18 that connects the device to the external telephone lines, an encoding/decoding part (CODEC) 19 that performs encoding/decoding of the digitized binary image signal into facsimile coded data, a character generator 20 that generates a character pattern corresponding to the character code included in the received file data, a display part 21 which uses a display device such as an LCD (liquid crystal display device) or the like and a clock 22 or the like that records the absolute time (Year, Month, Date, Hour, Minute, Second).

The actions of the facsimile device of the present invention shown in FIG. 1 are controlled by the CPU 11 in accordance with the programs stored in the ROM 12. The general actions during facsimile communication by such a facsimile device are as described below. It should be noted that the execution of facsimile communication are carried out in 5 phases regulated by ITU-T. 30. These phases are: phase A (call establishment) for connection of the communication lines between the two devices; phase B (pre-message procedures) for exchanging various handshakes before the transmission of the message (the coded data of the original document to be transmitted or received); phase C (message transmission) for exchanging the message; phase D (post-message procedures) for completion of the message and confirmation of that; and phase E (call release) for cutting the communication line between the two devices.

When the facsimile device of the present invention performs normal facsimile transmission, in short, when it acts as the calling device, the user makes the scanning part 15 scan the document to be transmitted, specifies that transmission is to be performed by operation of the operation part 16 and dials the telephone number of the third party. In response to this, the CPU 11 first performs the call establishment of phase A. In short, the CPU 11 connects to the communication network by commanding the NCU 17 and performs a call operation. When a line has been established with the facsimile device being the communication third party by this call establishment, the discrimination and selection of functions required at both devices is performed by the CPU 11 executing the phase B pre-message procedures.

During this period, the digital signal scanned from the document by the scanning part 15 and converted to binary is sequentially stored in the RAM 13 after being encoded (compressed) in accordance with a coding method such as MH, MR or the like by the coding/decoding part 19. Then the phase C message transmission is performed while the CPU 11 is taking the signal phase and synchronization with the facsimile device of the communication third party connected by call establishment (in short, the encoded digital image signal (message) obtained from the document that is to be transmitted to the communication third party is transmitted via the modem 18 and NCU 17).

When transmission of the whole message is complete, the CPU 11 performs phase D post-message procedures, in short, completes the message and confirms this. Once this confirmation has been obtained, the CPU 11 cuts the lines by commanding the NCU 17 and performs phase E call release.

The above are the basic operations of normal facsimile communication at the calling side. Hereafter, the basic operations when the facsimile device of the present invention is the receiving side are as described below.

At the called device, when the NCU 17 connects to the communication line network due to the call establishment from the other device (calling device), communication with the calling device becomes possible by the CPU 11 performing phase B pre-message procedures. Thereafter, the CPU 11 receives via the NCU 17 and modem 18 the encoded digital image signal of the document to be received through phase C message transmission and stores it in the RAM 13.

Once all the signals of the document to be received have been received, the CPU 11 exchanges phase D post-message procedures with the calling device and once this has been confirmed, concludes communication by performing phase E line release.

Incidentally, at the aforementioned phase B pre-message procedures, it is possible for the calling device and called device to confirm whether the other has file transfer abilities. More specifically, at phase B pre-message procedures, the absence or presence of file transfer functions (functions that transfer the file data such as binary data or character data) is informed from the called device to the calling device by the transmission of a predetermined control signal (DIS:Digital Identification Signal). Accordingly, file transfer is possible at the calling side when the called side has file transfer functions, and that fact is informed to the called side by the transmission of a predetermined control signal (DCS:Digital Command Signal). Due to this, the called device is able to know at the phase B pre-message procedures that the calling device will transfer file data.

Figure 2:
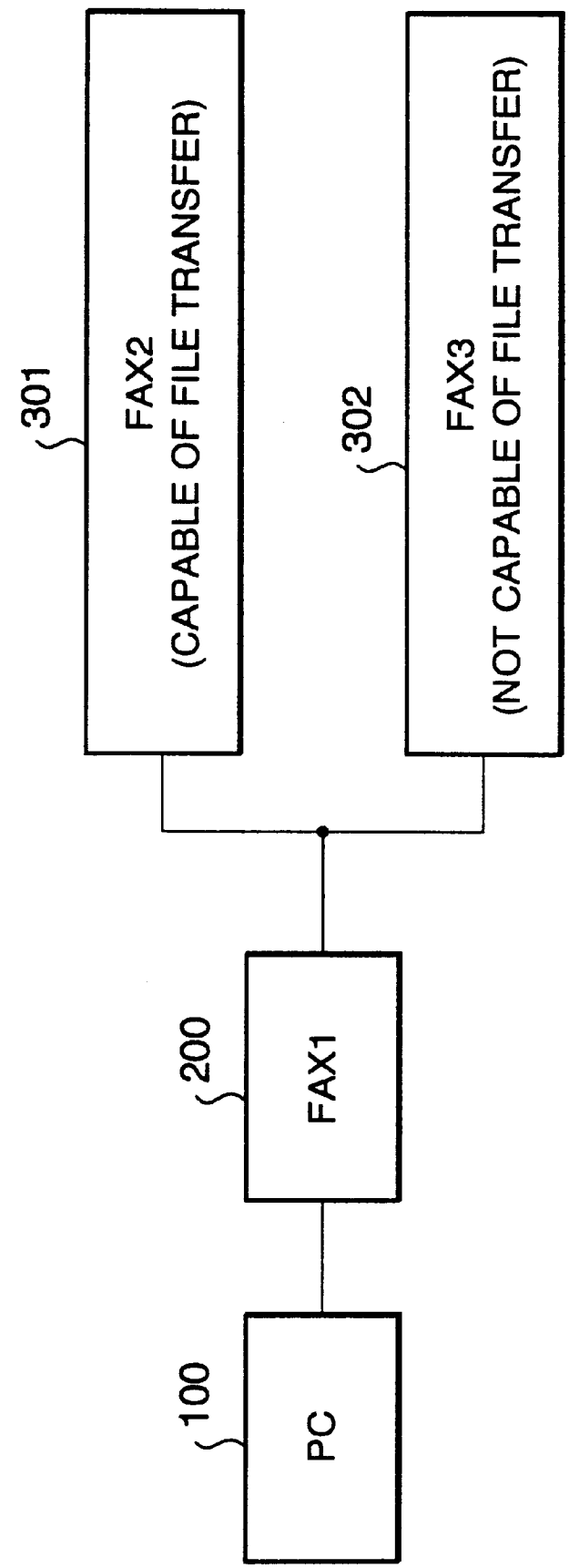
FIG. 2 is a block diagram showing an example of system arrangement when performing relay/broadcasting operations using the facsimile device of the present invention.

FIG. 2 is a block diagram showing a system arrangement whereby file data comprising character code or binary image data of bitmap format or TIFF format saved or produced by a personal computer (PC) 100 is broadcast (and also relayed)

to two facsimile devices (FAX2, FAX3) 301,302 by way of the facsimile device (FAX1) 200 of the present invention as a relay intermediator. It should be stated that in this embodiment, one of the facsimile devices 301 has file transfer functions and the other facsimile device 302 does not have file transfer functions.

Accordingly, when the facsimile device 200 of the present invention relays the file data received from the personal computer 100 to the facsimile device 301 having file transfer functions, it may perform direct file data transmission. However, when the facsimile device 200 relays the file data received from the personal computer 100 to the facsimile device 302 not having file transfer functions, conversion of the file data to facsimile coded data is necessary before the transmission.

Figure 3:
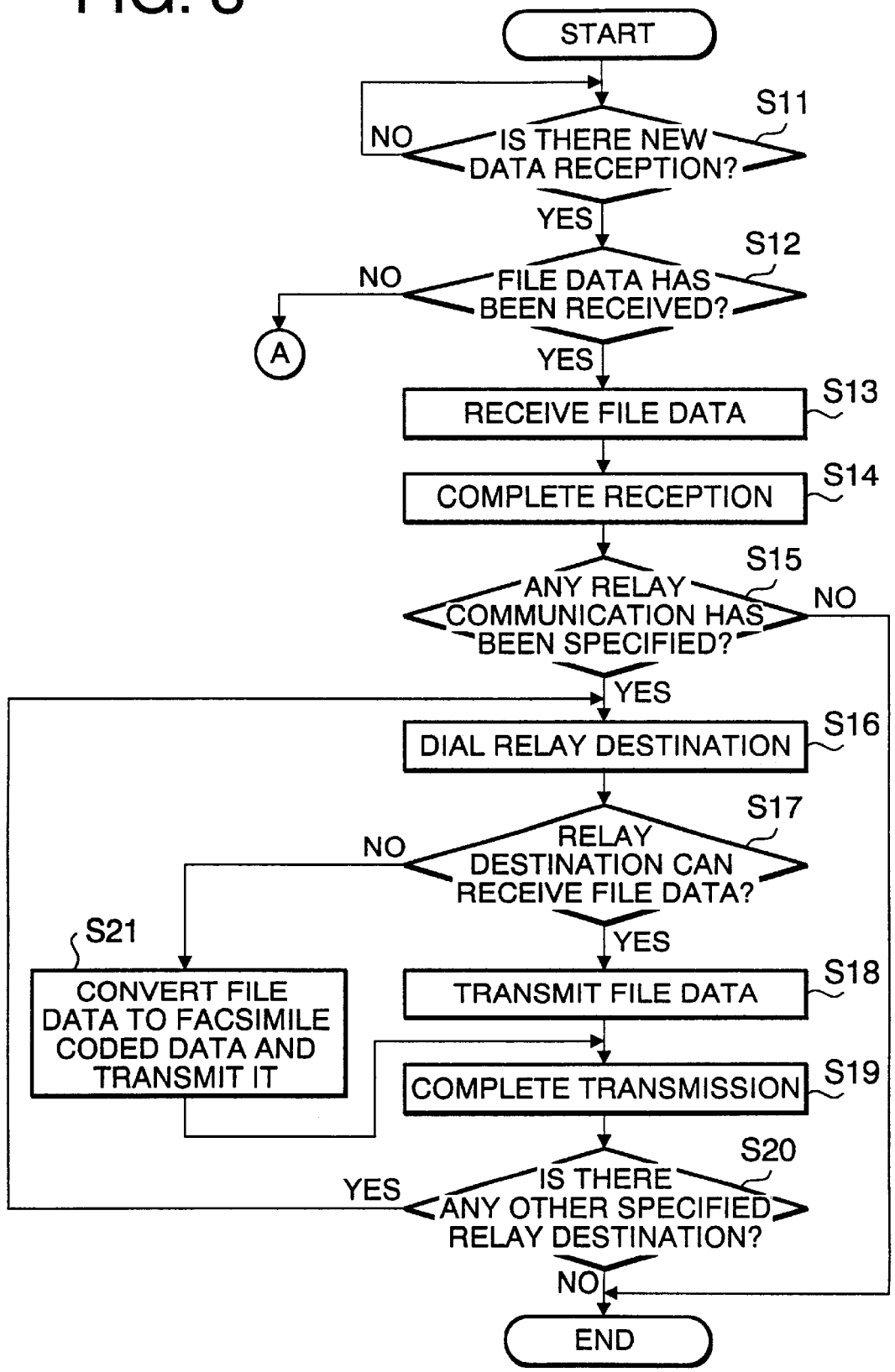
FIG. 3 is a flow chart for describing the actions of the facsimile device of the present invention.

Hereafter, the operations of the system arrangement of the facsimile device 200 of the present invention as shown in FIG. 2 (that is, the control procedures of the CPU 10) will be described with reference to the flow charts of FIGS. 3 and 4. Firstly, the case will be described where file data is transmitted from the personal computer 100 to the facsimile device 200 of the present invention with the facsimile devices 301,302 as relay destinations.

The CPU 10 of the facsimile device 200 of the present invention is always checking whether any new data has been received or not and when there is a new data, it checks whether the received data is file data or not (step S12). As mentioned earlier, when the file data from the personal computer 100 is to be transmitted to the facsimile device 200 of the present invention with the facsimile devices 301,302 as relay destinations, the facsimile device 200 of the present invention receives this file data and stores it in the RAM 13 (step S12, S13) and once reception is complete, checks whether there is to be a relay communication, in short whether a relay destination has been specified or not (step S14, S15).

When a relay communication has been specified, the CPU 10 makes the NCU 17 dial the telephone number of that specified relay destination (step S16) and at the same time, checks whether the relay destination with that telephone number is a device capable of reception of file data (step S17). In the case shown in FIG. 2, as both a facsimile device 301 having file transfer functions and a facsimile device 302 not having file transfer functions have been specified as simultaneous relay destinations, the CPU 10 firstly dials the telephone number of the facsimile device 301 having file transfer functions and as mentioned before, checks whether the facsimile device 301 has file transfer functions or not at the pre-message procedures of phase B (step S17). In this case, as facsimile device 301 has those functions, the file data received from the personal computer 100 is transmitted directly to facsimile device 301 from the facsimile device 200 of the present invention (step S18). Then once transmission is complete (step S19), the CPU 10 checks whether another relay destination has been specified or not (step S20).

In this example, as the facsimile device 302 not having file transfer functions has also been specified as a relay destinations, the CPU 10 of the facsimile device 200 of the present invention then dials the telephone number of the facsimile device 302 (step S16) and similar to when dialing the facsimile device 301, checks whether the facsimile device 302 has file transfer functions or not at the pre-message procedures of phase B (step S17). In this case, as facsimile device 302 does not have those functions, the CPU 10 of the facsimile device 200 of the present invention converts the file data received from the personal computer 100 and stored in the RAM 13 to facsimile coded data at the coding/decoding part 19 and then transmits the facsimile coded data (step S21). Then, once transmission is complete (step S19), the CPU 10 checks whether another relay destination has been specified or not (step S20). In this example, as no other relay destination has been specified, processing is concluded at this point.

When it turned out at step S15 that any relay communication has not been specified, the CPU 10 concludes processing at that point.

On the other hand, when the facsimile device 200 of the present invention receives facsimile coded data, the facsimile coded data is directly received and stored in the RAM 13 (step S30, S31). Once reception is complete, a check is performed of whether there to be a relay communication or not, in short, whether a relay destination has been specified or not (step S32).

When a relay communication has been specified, the CPU 10 makes the NCU 17 dial the telephone number of that specified relay destination (step S33) and directly transmits the facsimile coded data received from the personal computer 100 to the facsimile device 301 (step S34). Then, once transmission is complete (step S35), the CPU 10 checks whether another relay destination has been specified or not (step S36).

When another relay destination has been specified, the transmission of the facsimile coded data is performed to that facsimile device as described earlier. When it turned out at step S15 that any relay communication has not been specified, the CPU 10 concludes processing at that point.

In the example shown in FIG. 2, the facsimile device 200 of the present invention is positioned to relay the transmission from the personal computer 100 to the facsimile device 301 having file transfer functions and a facsimile device 302 not having file transfer functions. However, this is purely an example, and the facsimile device 200 of the present invention may be positioned at the uppermost point in the flow of the communication instead of the personal computer 100 or may be optionally positioned at any position between the personal computer and the last relay destination at a multi-level relay system.

As described above, according to the communication terminal device of the present invention, when file data is to be relayed, the received file data is directly transmitted to a relay destination when the communication terminal device of that relay destination has file transfer functions and the received file data is transmitted after conversion to facsimile coded data when the communication terminal device of that relay destination does not have file transfer functions. Thus it is not necessary to check beforehand for the presence or absence of file transfer functions. Furthermore, it is easily possible, as requested, to perform a file transfer to one device in the form of a character code or binary image data and then convert the data to the facsimile coded data at the font or resolution of that particular device.

What is claimed is:

1. A communication terminal device having a function for relaying file data from a transmitting terminal device to a plurality of specified devices, and a transfer function for the file data comprising:

means for receiving the file data from said transmitting terminal device;

means for discriminating the file data from facsimile coded data;

means for, when one of the specified devices as relay destination has the transfer function for the file data, directly transmitting the received file data to said one specified device; and means for, when another of the specified devices as relay destination does not have the transfer function for the file data, converting the received file data to the facsimile coded data and then transmitting it to said another specified device.

2. The communication terminal device as in claim 1, wherein the file data to be transferred includes character code, further provided with a character generator that converts the character code to a character pattern.

3. The communication terminal device as in claim 1, wherein the file data to be transferred includes binary image data.

4. The communication terminal device as in claim 1, further provided with means for confirming whether or not the specified device as the relay destination has the transfer function for file data.

* * * * *